United States Patent
Matsubara et al.

(10) Patent No.: US 9,677,655 B2
(45) Date of Patent: Jun. 13, 2017

(54) HYBRID VEHICLE DRIVING DEVICE

(75) Inventors: Tooru Matsubara, Toyota (JP); Kenta Kumazaki, Toyota (JP); Tatsuya Imamura, Okazaki (JP); Takeshi Kitahata, Toyota (JP); Yasuhiro Hiasa, Nagoya (JP); Atsushi Tabata, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 162 days.

(21) Appl. No.: 14/414,192

(22) PCT Filed: Jul. 17, 2012

(86) PCT No.: PCT/JP2012/068132
§ 371 (c)(1),
(2), (4) Date: Jan. 12, 2015

(87) PCT Pub. No.: WO2014/013556
PCT Pub. Date: Jan. 23, 2014

(65) Prior Publication Data
US 2015/0211620 A1    Jul. 30, 2015

(51) Int. Cl.
*F16H 48/27* (2012.01)
*B60K 6/365* (2007.10)
(Continued)

(52) U.S. Cl.
CPC ............ *F16H 48/27* (2013.01); *B60K 6/365* (2013.01); *B60K 6/387* (2013.01); *B60K 6/445* (2013.01);
(Continued)

(58) Field of Classification Search
CPC ................ F16H 48/27; F16H 61/0206; F16H 2200/2007; B60K 6/365; B60K 6/20; B60W 10/10; B60W 20/20
See application file for complete search history.

(56) References Cited

U.S. PATENT DOCUMENTS 6,494,801 B1 * 12/2002 Ohtake .................. B60K 6/365
                                                          475/127
6,508,741 B1 *  1/2003 Murakami ............. B60K 6/365
                                                          477/149
(Continued)

FOREIGN PATENT DOCUMENTS

JP    2007-203787 A     8/2007
JP    2009-190694       8/2009

OTHER PUBLICATIONS

International Search Report issued Aug. 28, 2012, in PCT/JP2012/068132, filed Jul. 17, 2012.

*Primary Examiner* — Stacey Fluhart
(74) *Attorney, Agent, or Firm* — Oblon, McClelland, Maier & Neustadt, L.L.P.

(57) ABSTRACT

A hybrid vehicle driving device includes: a first differential mechanism connected to an engine and transmitting a rotation of the engine; a second differential mechanism connecting the first differential mechanism and a drive wheel; engagement devices changing a speed of the first differential mechanism; and a valve arranged in a hydraulic circuit and regulating the engagement devices from simultaneously engaging. The second differential mechanism includes a first rotation element connected to an output element of the first differential mechanism, a second rotation element connected to a first rotating machine, and a third rotation element connected to a second rotating machine and the drive wheel. The valve regulates the engagement devices from simultaneously engaging at a time of traveling with the engine, and tolerates the engagement devices from simultaneously engaging at a time of traveling with the first rotating machine and the second rotating machine.

6 Claims, 9 Drawing Sheets

(51) Int. Cl.
*B60K 6/445* (2007.10)
*B60W 10/30* (2006.01)
*B60W 20/00* (2016.01)
*B60K 6/387* (2007.10)
*B60W 10/08* (2006.01)
*F16H 61/00* (2006.01)
*F16H 61/02* (2006.01)
*B60W 10/10* (2012.01)
*F16H 48/06* (2006.01)
*B60K 6/38* (2007.10)
*F16H 37/08* (2006.01)

(52) U.S. Cl.
CPC ............ *B60W 10/08* (2013.01); *B60W 10/10* (2013.01); *B60W 10/30* (2013.01); *B60W 20/00* (2013.01); *F16H 48/06* (2013.01); *F16H 61/0031* (2013.01); *F16H 61/0206* (2013.01); *B60K 2006/381* (2013.01); *B60Y 2200/92* (2013.01); *F16H 2037/0866* (2013.01); *Y02T 10/6239* (2013.01); *Y10S 903/911* (2013.01)

(56) References Cited

U.S. PATENT DOCUMENTS

| | | | |
|---|---|---|---|
| 6,655,485 B1* | 12/2003 | Ito | B60W 20/40 180/65.6 |
| 2001/0016165 A1* | 8/2001 | Shimabukuro | B60K 6/365 417/2 |
| 2004/0067810 A1* | 4/2004 | Fujimine | F16H 61/0206 475/127 |
| 2007/0049442 A1* | 3/2007 | Long | B60K 6/26 475/5 |
| 2009/0253544 A1* | 10/2009 | Foster | B60K 6/365 475/146 |
| 2009/0253552 A1* | 10/2009 | Foster | B60K 6/365 477/130 |
| 2009/0291802 A1* | 11/2009 | Herrmann | F16D 48/0206 477/39 |
| 2012/0072065 A1* | 3/2012 | Minamikawa | B60K 6/445 701/22 |
| 2013/0023368 A1* | 1/2013 | Tamai | B60K 6/365 475/5 |

* cited by examiner

| DRIVE STATE | | | CL1 | BK1 | MG1 | MG2 |
|---|---|---|---|---|---|---|
| EV | FORWARD MOVEMENT | SINGLE MOTOR | △ | △ | G | M |
| | | TWO MOTORS | ○ | ○ | M | M |
| | BACKWARD MOVEMENT | SINGLE MOTOR | | | | M |
| | | TWO MOTORS | ○ | ○ | M | M |
| HV | FORWARD MOVEMENT | DIFFERENTIAL LOW | ○ | | G | M |
| | | DIFFERENTIAL HIGH | | ○ | G | M |
| | BACKWARD MOVEMENT | LOW | ○ | | G | M |

○: ENGAGED    △: EITHER ONE IS ENGAGED IN SIMULTANEOUS USE OF ENGINE BRAKE
G: MAINLY GENERATOR AT TIME OF DRIVE    M: MAINLY MOTOR AT TIME OF DRIVE

HYBRID VEHICLE DRIVING DEVICE

FIELD

The present invention relates to a hybrid vehicle driving device.

BACKGROUND

Conventionally, a hybrid vehicle including a transmission mechanism that changes the rotation speed of an engine and transmits the rotation of the engine is known. For example, a driving device of a hybrid vehicle described in Patent Literature 1 includes a transmission mechanism that changes the rotation speed of an internal combustion engine and transmits the same to a power distributing mechanism, a first transmission shaft that transmits the power from the internal combustion engine to the transmission mechanism, and a second transmission shaft that transmits the power output from the transmission mechanism to the power distributing mechanism. The transmission mechanism includes a differential mechanism in which two sets of planetary gear mechanisms are combined, a first brake B1 that can stop the rotation of a ring gear R1 of the differential mechanism, a second brake B2 that can stop the rotation of a ring gear R2, and a clutch C that discontinues the power transmission from the first transmission shaft to the ring gear R1.

According to the driving device of the hybrid vehicle according to Patent Literature 1, a direct transmission torque can be increased to reduce a torque of a rotating electrical machine while preventing lowering of fuel efficiency at the time of light load, and sufficient backward movement drive force can be ensured.

CITATION LIST

Patent Literature

Patent Literature 1: Japanese Patent Application Laid-open No. 2009-190694

SUMMARY

Technical Problem

In the hybrid vehicle including the transmission mechanism that changes the rotation speed of the engine and transmits the rotation of the engine, if a plurality of engagement devices for gear changing the transmission mechanism is arranged, the plurality of engagement devices are desirably appropriately regulated or tolerated from simultaneously engaging. For example, the plurality of engagement devices are preferably regulated or tolerated from simultaneously engaging according to the traveling mode.

It is an object of the present invention to provide a hybrid vehicle driving device that can appropriately regulate or tolerate the plurality of engagement devices from simultaneously engaging.

Solution to Problem

A hybrid vehicle driving device according to the present invention includes: a first differential mechanism connected to an engine and transmitting a rotation of the engine; a second differential mechanism connecting the first differential mechanism and a drive wheel; a plurality of engagement devices changing a speed of the first differential mechanism; and a valve arranged in a hydraulic circuit supplying a hydraulic pressure to the plurality of engagement devices, and regulating the plurality of engagement devices from simultaneously engaging, wherein the second differential mechanism includes a first rotation element connected to an output element of the first differential mechanism, a second rotation element connected to a first rotating machine, and a third rotation element connected to a second rotating machine and the drive wheel, the valve is configured to regulate the plurality of engagement devices from simultaneously engaging at a time of traveling with the engine as a power source, and the valve is configured to tolerate the plurality of engagement devices from simultaneously engaging at a time of traveling with the first rotating machine and the second rotating machine as the power source.

In the above-described hybrid vehicle driving device, the valve is configured to further regulate the plurality of engagement devices from simultaneously engaging at a time of traveling with the second rotating machine as a single power source.

In the above-described hybrid vehicle driving device, the plurality of engagement devices are configured to regulate a rotation of at least one of the output element and the engine by simultaneously engaging.

In the above-described hybrid vehicle driving device, the hybrid vehicle driving device further includes: a first oil pump supplying a hydraulic pressure with respect to the plurality of engagement devices by being driven by the rotation of the engine; and a second oil pump supplying a hydraulic pressure with respect to the plurality of engagement devices and the valve by being driven at a time the engine is stopped, wherein the valve is configured to regulate the plurality of engagement devices from simultaneously engaging at a time the hydraulic pressure of the first oil pump is supplied, and to tolerate the plurality of engagement devices from simultaneously engaging at a time the hydraulic pressure of the second oil pump is supplied.

Advantageous Effects of Invention

A hybrid vehicle driving device according to the present invention includes a valve that regulates a plurality of engagement devices for gear changing a first differential mechanism from simultaneously engaging. The valve regulates the plurality of engagement devices from simultaneously engaging when traveling with the engine as a power source, and tolerates the plurality of engagement devices from simultaneously engaging when traveling with a first rotating machine and a second rotating machine as the power source. The hybrid vehicle driving device according to the present invention has an effect in that the plurality of engagement devices can be appropriately regulated or tolerated from simultaneously engaging.

DESCRIPTION OF EMBODIMENTS

A hybrid vehicle driving device according to embodiments of the present invention will be hereinafter described in detail with reference to the drawings. The present invention is not limited by such embodiments. The configuring elements in the following embodiments include elements that can be easily contrived by those skilled in the art or substantially the same elements.

First Embodiment

Figure 1:
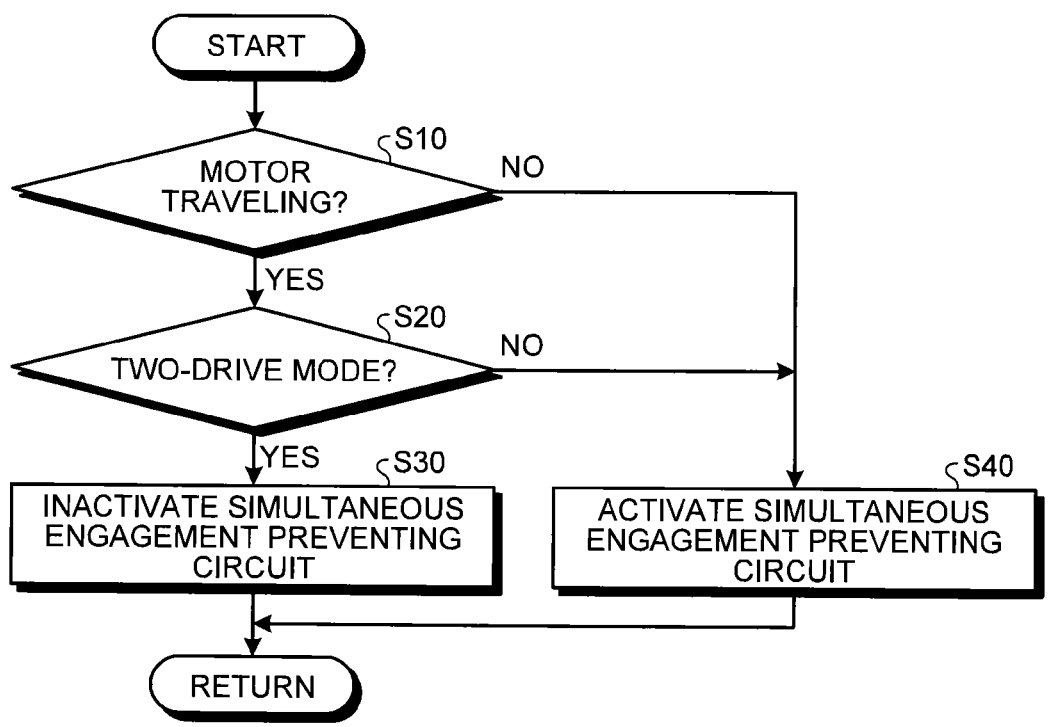
FIG. 1 is a flowchart illustrating an operation of a hybrid vehicle driving device according to a first embodiment.
Figure 2:
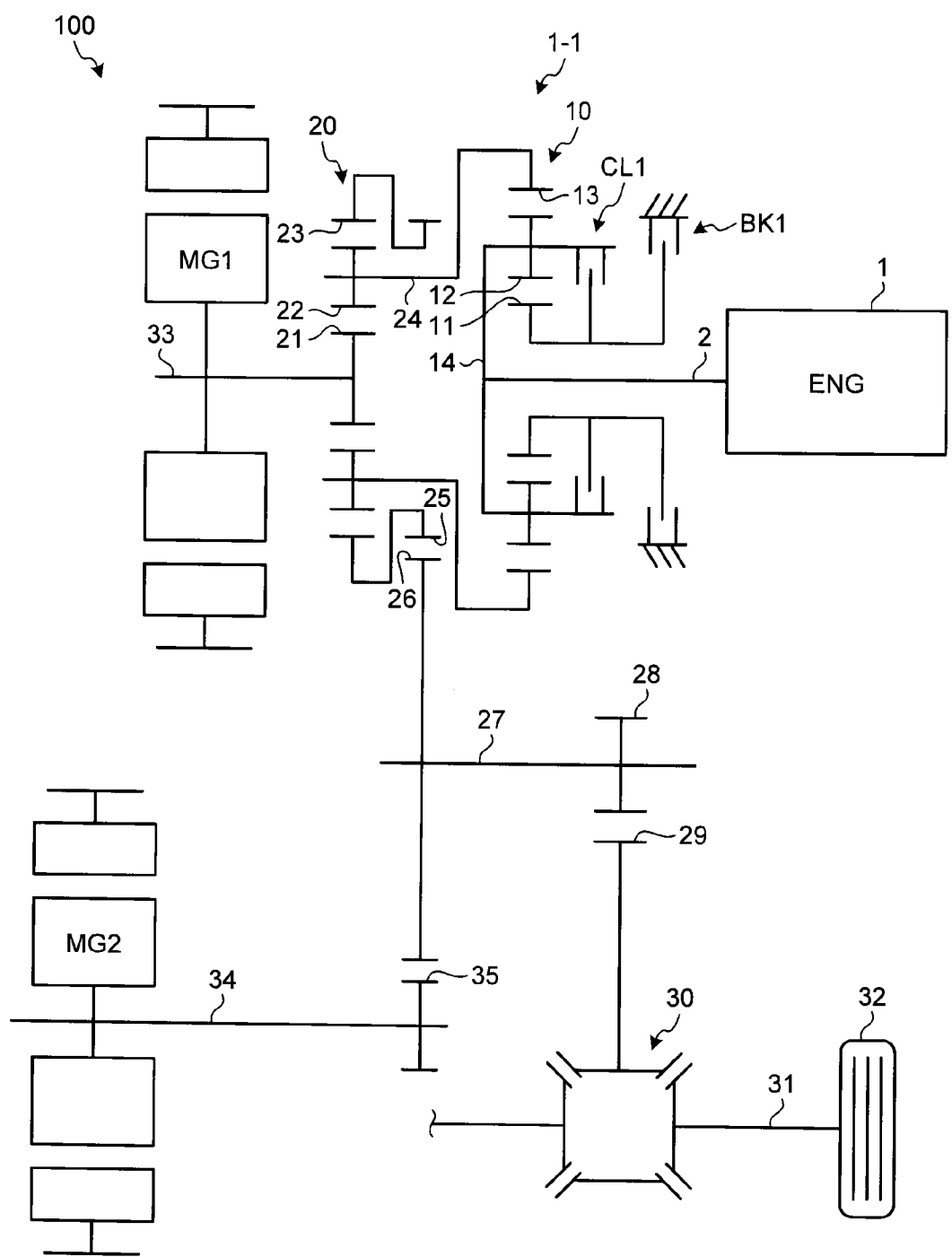
FIG. 2 is a skeleton view of a vehicle according to the first embodiment.
Figures 3, 4:
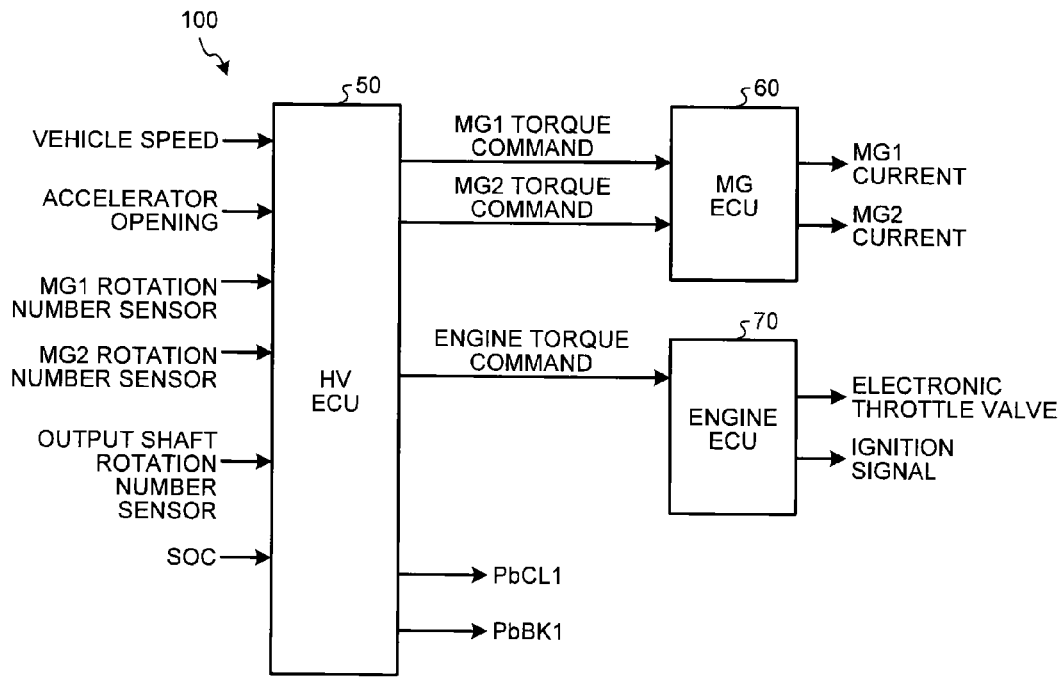
FIG. 3 is an input/output relational diagram of the vehicle according to the first embodiment.
FIG. 4 is a view illustrating an activated engagement table of the hybrid vehicle driving device according to the first embodiment.
Figure 5:
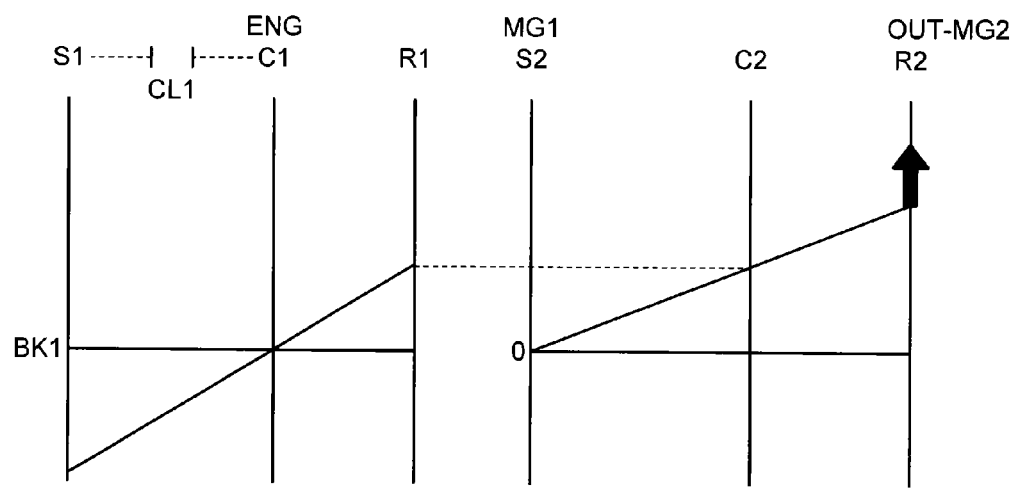
FIG. 5 is a collinear diagram related to a single motor EV mode.
Figure 6:
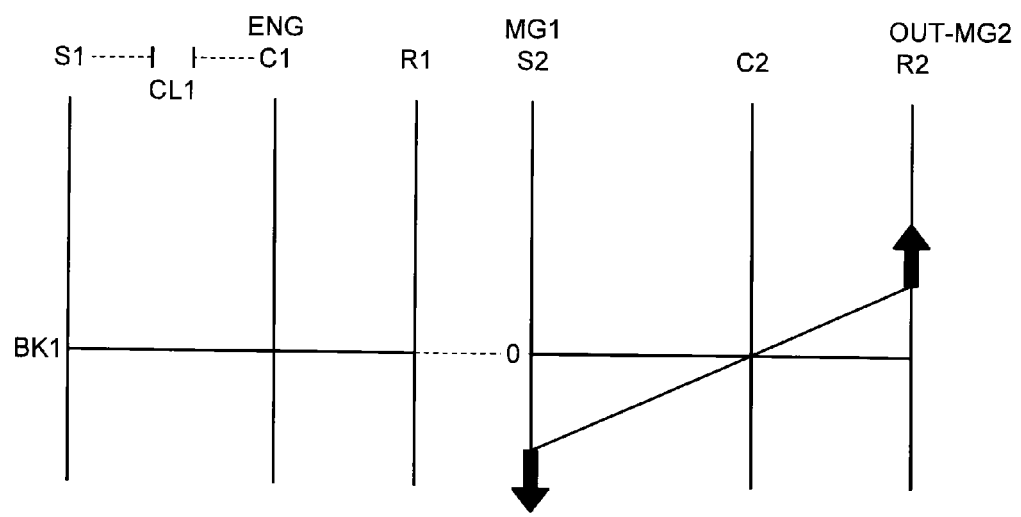
FIG. 6 is a collinear diagram related to a two-drive EV mode.
Figure 7:
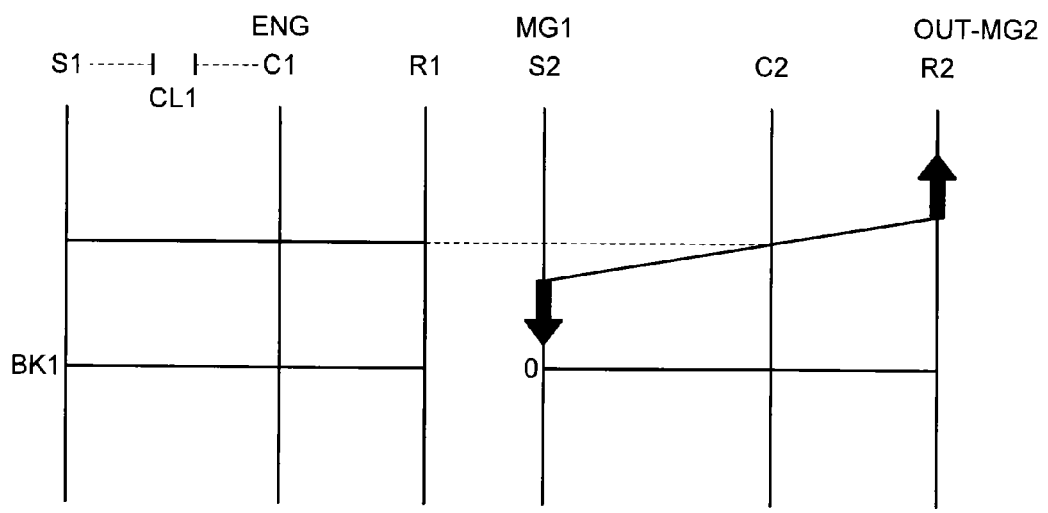
FIG. 7 is a collinear diagram related to an HV low mode.
Figure 8:
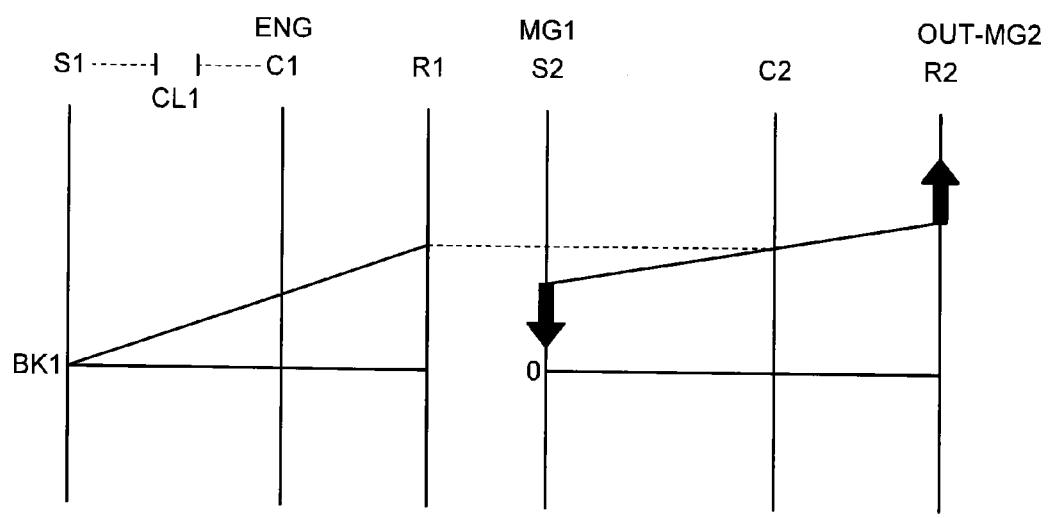
FIG. 8 is a collinear diagram related to an HV high mode.
Figure 9:
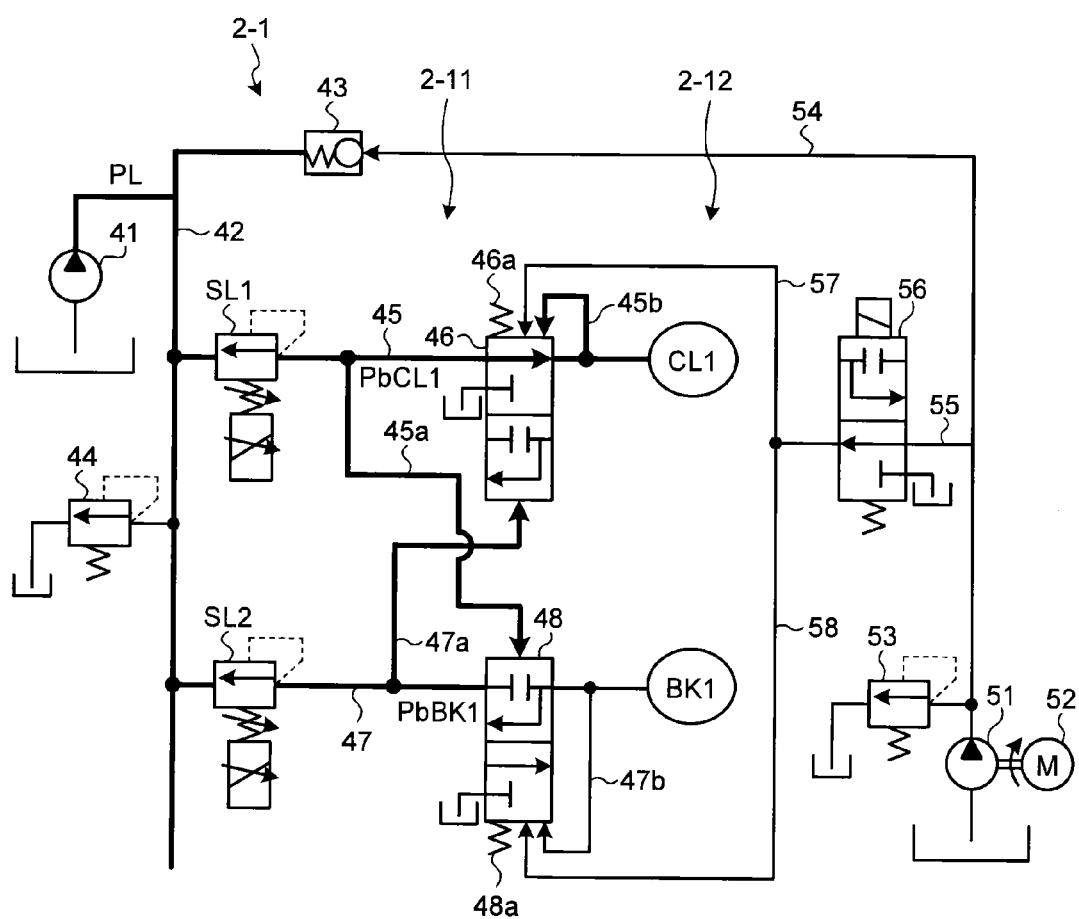
FIG. 9 is a hydraulic circuit diagram according to the first embodiment.
Figure 10:
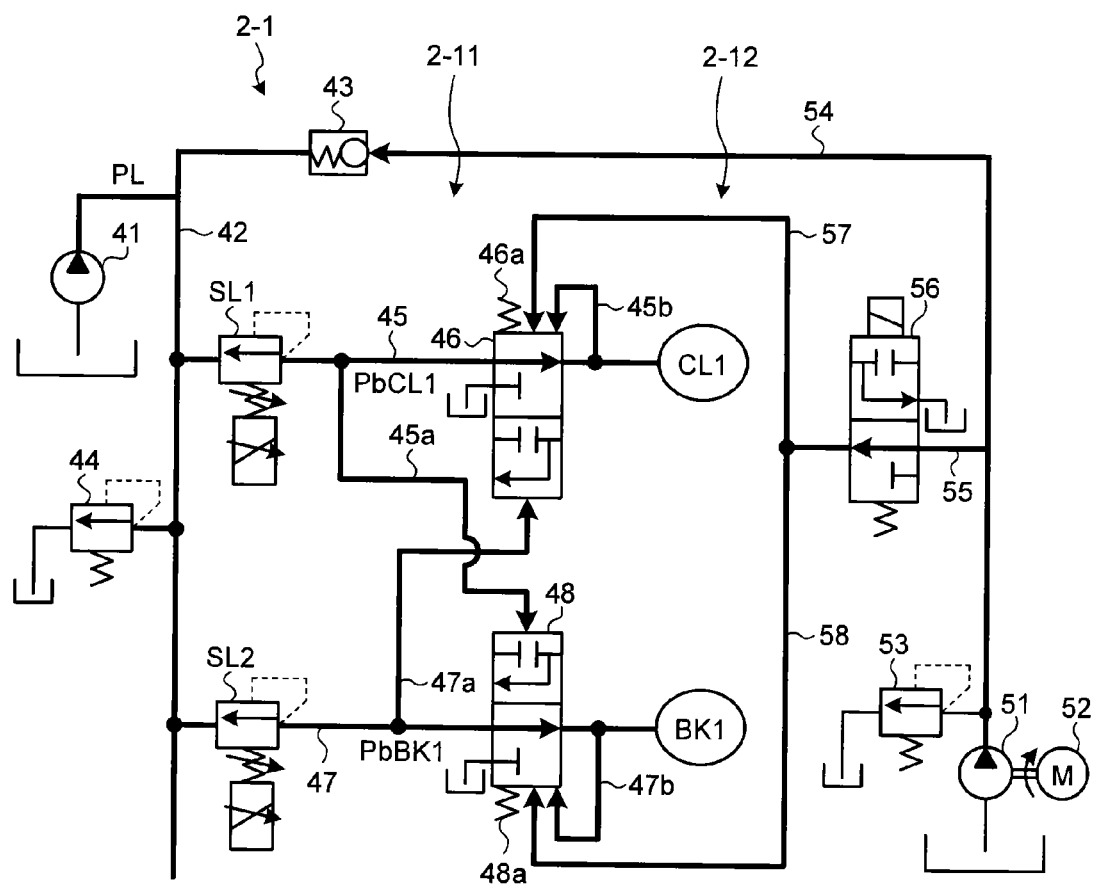
FIG. 10 is a view illustrating an inactivated state of a simultaneous engagement preventing circuit.

A first embodiment will be described with reference to FIG. 1 to FIG. 10. The present embodiment relates to a hybrid vehicle driving device. FIG. 1 is a flowchart illustrating an operation of the hybrid vehicle driving device according to the first embodiment of the present invention; FIG. 2 is a skeleton diagram of a vehicle according to the first embodiment; FIG. 3 is an input/output relational diagram of the vehicle according to the first embodiment; FIG. 4 is a view illustrating an activated engagement table of the hybrid vehicle driving device according to the first embodiment; FIG. 5 is a collinear diagram related to a single motor EV mode; FIG. 6 is a collinear diagram related to a two-drive EV mode; FIG. 7 is a collinear diagram related to a HV low mode; FIG. 8 is an collinear diagram related to an HV high mode; FIG. 9 is a hydraulic circuit diagram according to the first embodiment; and FIG. 10 is a view illustrating a inactivated state of a simultaneous engagement preventing circuit.

As illustrated in FIG. 2, a vehicle 100 according to the present embodiment is a hybrid (HV) vehicle including an engine 1, a first rotating machine MG1 and a second rotating machine MG2 as a power source. The vehicle 100 may be a plug-in hybrid (PHV) vehicle chargeable with an external power supply. As illustrated in FIG. 2 and FIG. 3, the vehicle 100 is configured to include the engine 1, a first planetary gear mechanism 10, a second planetary gear mechanism 20, the first rotating machine MG1, the second rotating machine MG2, a clutch CL1, a brake BK1, an HV_ECU 50, an MG_ECU 60, and an engine_ECU 70.

A hybrid vehicle driving device 1-1 according to the present embodiment is configured including the engine 1, the first planetary gear mechanism 10, the second planetary gear mechanism 20, the clutch CL1, the brake BK1, and simultaneous engagement preventing valves 46, 48 (see FIG. 9). The hybrid vehicle driving device 1-1 may be configured to further include a control device such as each ECUs 50, 60, 70, and the like. The hybrid vehicle driving device 1-1 is applicable to an FF (pre-engine front wheel drive) vehicle or an RR (post-engine rear wheel drive) vehicle, and the like. The hybrid vehicle driving device 1-1 is mounted on the vehicle 100 such that a width direction becomes a vehicle width direction, for example.

In the hybrid vehicle driving device 1-1 according to the present embodiment, a transmission unit is configured including the first planetary gear mechanism 10, the clutch CL1, and the brake BK1. A differential unit is configured including the second planetary gear mechanism 20. The clutch CL1 and the brake BK1 are included in a plurality of engagement devices that changes speed of the first planetary gear mechanism 10.

The engine 1, which is an engine, converts a combustion energy of a fuel to a rotation movement of an output shaft, and outputs the same. An output shaft of the engine 1 is connected to an input shaft 2. The input shaft 2 is an input shaft of a power transmitting device. The power transmitting device is configured including the first rotating machine MG1, the second rotating machine MG2, the clutch CL1, the brake BK1, a differential device 30, and the like. The input shaft 2 is arranged coaxially with the output shaft of the engine 1 and on an extended line of the output shaft. The input shaft 2 is connected to a first carrier 14 of the first planetary gear mechanism 10.

The first planetary gear mechanism 10 of the present embodiment is connected to the engine 1, and is mounted on the vehicle 100 as a first differential mechanism for transmitting the rotation of the engine 1. The first planetary gear mechanism 10 is an input side differential mechanism arranged on the engine 1 side than the second planetary gear mechanism 20. The first planetary gear mechanism 10 can change the rotation speed of the engine 1 and output the same. The first planetary gear mechanism 10 is a single pinion type, and includes a first sun gear 11, a first pinion gear 12, a first ring gear 13, and the first carrier 14.

The first ring gear 13 is arranged coaxial with the first sun gear 11 and on a radially outer side of the first sun gear 11. The first pinion gear 12 is arranged between the first sun gear 11 and the first ring gear 13, and is geared with the first sun gear 11 and the first ring gear 13 each. The first pinion gear 12 is supported in a freely rotating manner by the first carrier 14. The first carrier 14 is coupled with the input shaft 2 to integrally rotate with the input shaft 2. Therefore, the first pinion gear 12 can rotate (revolve) about a center shaft line of the input shaft 2 with the input shaft 2, and is supported by the first carrier 14 and can rotate (revolve) about a center shaft line of the first pinion gear 12.

The clutch CL1 is a clutch device capable of coupling the first sun gear 11 and the first carrier 14. The clutch CL1 may be, for example, a friction engagement type clutch, but this is not the sole case, and a clutch device such as a gearing type clutch, and the like may be used as the clutch CL1. The clutch CL1 is, for example, controlled by a hydraulic pressure to be engaged or released. The clutch CL1 in a completely engaged state couples the first sun gear 11 and the first carrier 14, and can integrally rotate the first sun gear 11 and the first carrier 14. The clutch CL1 in the completely engaged state regulates the differential of the first planetary gear mechanism 10. On the other hand, the clutch CL1 in the released state separates the first sun gear 11 and the first carrier 14, and tolerates the relative rotation of the first sun gear 11 and the first carrier 14. That is, the clutch CL1 in the released state tolerates the differential of the first planetary gear mechanism 10. The clutch CL1 can be controlled to a half-engaged state. The clutch CL1 in the half-engaged state tolerates the differential of the first planetary gear mechanism 10.

The brake BK1 is a brake device that can regulate the rotation of the first sun gear 11. The brake BK1 includes an engagement element connected to the first sun gear 11, and an engagement element connected to a case on a vehicle body side, for example, a power transmitting device. The brake BK1 may be a friction engagement type clutch device similar to the clutch CL1, but this is not the sole case, and a clutch device such as a gearing type clutch, and the like may be used as the brake BK1. The brake BK1 is, for example, controlled by a hydraulic pressure to be engaged or released. The brake BK1 in a completely engaged state couples the first sun gear 11 and the vehicle body side, and can regulate the rotation of the first sun gear 11. On the other hand, the brake BK1 in the released state separates the first sun gear 11 and the vehicle body side, and tolerates the rotation of the first sun gear 11. The brake BK1 can be controlled to a half-engaged state. The brake BK1 in the half-engaged state tolerates the rotation of the first sun gear 11.

The second planetary gear mechanism 20 of the present embodiment is mounted on the vehicle 100 as a second differential mechanism that connects the first planetary gear mechanism 10 and a drive wheel 32. The second planetary gear mechanism 20 is an output side differential mechanism arranged on the drive wheel 32 side than the first planetary gear mechanism 10. The second planetary gear mechanism 20 is a single pinion type, and includes a second sun gear 21, a second pinion gear 22, a second ring gear 23, and a second carrier 24. The second planetary gear mechanism 20 is arranged coaxial with the first planetary gear mechanism 10, and faces the engine 1 with the first planetary gear mechanism 10 in between.

The second ring gear 23 is arranged coaxial with the second sun gear 21 and on the radially outer side of the second sun gear 21. The second pinion gear 22 is arranged between the second sun gear 21 and the second ring gear 23, and is geared with the second sun gear 21 and the second ring gear 23. The second pinion gear 22 is supported in a freely rotating manner by the second carrier 24. The second carrier 24 is connected to the first ring gear 13 to integrally rotate with the first ring gear 13. The second pinion gear 22 can rotate (revolve) about a center shaft line of the input shaft 2 with the second carrier 24, and is supported by the second carrier 24 to rotate (revolve) about a center shaft line of the second pinion gear 22. The first ring gear 13 is an output element of the first planetary gear mechanism 10, and can output the rotation input from the engine 1 to the first planetary gear mechanism 10 to the second carrier 24. The second carrier 24 corresponds to a first rotation element connected to the output element of the first planetary gear mechanism 10.

A rotation shaft 33 of the first rotating machine MG1 is connected to the second sun gear 21. The rotation shaft 33 of the first rotating machine MG1 is arranged coaxial with the input shaft 2 and integrally rotates with the second sun gear 21. The second sun gear 21 corresponds to a second rotation element connected to the first rotating machine MG1. A counter drive gear 25 is connected to the second ring gear 23. The counter drive gear 25 is an output gear that integrally rotates with the second ring gear 23. The second ring gear 23 corresponds to a third rotation element connected to the second rotating machine MG2 and the drive wheel 32. The second ring gear 23 is an output element that can output the rotation input from the first rotating machine MG1 or the first planetary gear mechanism 10 to the drive wheel 32.

The counter drive gear 25 gears with a counter driven gear 26. The counter driven gear 26 is connected to a drive pinion gear 28 by way of a countershaft 27. The counter driven gear 26 and the drive pinion gear 28 integrally rotate. A reduction gear 35 is geared with the counter driven gear 26. The reduction gear 35 is connected to a rotation shaft 34 of the second rotating machine MG2. That is, the rotation of the second rotating machine MG2 is transmitted to the counter driven gear 26 through the reduction gear 35. The reduction gear 35 has a smaller diameter than the counter driven gear 26, and reduces the rotation of the second rotating machine MG2 and transmits the same to the counter driven gear 26.

The drive pinion gear 28 is geared with a differential gear 29 of the differential device 30. The differential device 30 is connected to the drive wheel 32 by way of left and right drive shafts 31. The second ring gear 23 is connected to the drive wheel 32 by way of the counter drive gear 25, the counter driven gear 26, the drive pinion gear 28, the differential device 30 and the drive shaft 31. The second rotating machine MG2 is connected to a power transmitting path of the second ring gear 23 and the drive wheel 32, and can transmit power to each of the second ring gear 23 and the drive wheel 32.

The first rotating machine MG1 and the second rotating machine MG2 each has a function serving as a motor (electrical motor) and a function serving as a power generator. The first rotating machine MG1 and the second rotating machine MG2 are connected to a battery by way of an inverter. The first rotating machine MG1 and the second rotating machine MG2 can convert the power supplied from the battery to a mechanical power and output the same, and can also be driven by the input power to convert the mechanical power to power. The power generated by the rotating machines MG1, MG2 can be accumulated in the battery. For example, an AC synchronous motor generator can be used for the first rotating machine MG1 and the second rotating machine MG2.

In the vehicle 100 of the present embodiment, the brake BK1, the clutch CL1, the first planetary gear mechanism 10, the counter drive gear 25, the second planetary gear mechanism 20, and the first rotating machine MG1 are arranged coaxially with the engine 1 in order from a side close to the engine 1. The hybrid vehicle driving device 1-1 of the present embodiment is a plural-axes type in which the input shaft 2 and the rotation shaft 34 of the second rotating machine MG2 are arranged on different axes.

As illustrated in FIG. 3, the vehicle 100 includes the HV_ECU 50, the MG_ECU 60, and the engine_ECU 70. Each ECU 50, 60, 70 is an electronic control unit including a computer. The HV_ECU 50 has a function of comprehensively controlling the entire vehicle 100. The MG_ECU 60 and the engine_ECU 70 are electrically connected to the HV_ECU 50.

The MG_ECU 60 can control the first rotating machine MG1 and the second rotating machine MG2. The MG_ECU 60, for example, can adjust a current value to supply to the first rotating machine MG1 to control an output torque of the first rotating machine MG1, and can adjust a current value to supply to the second rotating machine MG2 to control an output torque of the second rotating machine MG2.

The engine_ECU 70 can control the engine 1. The engine_ECU 70, for example, can control an opening of an electronic throttle valve of the engine 1, output an ignition signal to carry out ignition control of the engine 1, and carry out injection control of the fuel with respect to the engine 1, and the like. The engine_ECU 70 can control the output torque of the engine 1 by the opening control of the electronic throttle valve, the injection control, the ignition control, and the like.

A vehicle speed sensor, an accelerator opening sensor, an MG1 rotation speed sensor, an MG2 rotation speed sensor, an output shaft rotation speed sensor, a battery sensor, and the like are connected to the HV_ECU 50. According to such sensors, the HV_ECU 50 can acquire the vehicle speed, the accelerator opening, the rotation speed of the first rotating machine MG1, the rotation speed of the second rotating machine MG2, the rotation speed of the output shaft of the power transmitting device, the battery state SOC, and the like.

The HV_ECU 50 can calculate a required drive force, a required power, a required torque, and the like with respect to the vehicle 100 based on the acquired information. The HV_ECU 50 determines an output torque (hereinafter also described as "MG1 torque") of the first rotating machine MG1, an output torque (hereinafter described as "MG2 torque") of the second rotating machine MG2, and an output torque (hereinafter also described as "engine torque") of the engine 1 based on the calculated required values. The HV_ECU 50 outputs a command value of the MG1 torque and the command value of the MG2 torque with respect to the MG_ECU 60. The HV_ECU 50 outputs the command value of the engine torque to the engine_ECU 70.

The HV_ECU 50 controls each of the clutch CL1 and the brake BK1 based on the traveling mode, and the like, to be described later. The HV_ECU 50 outputs a command value of a supplying hydraulic pressure (engagement hydraulic pressure) PbCL1 with respect to the clutch CL1 and a command value of a supplying hydraulic pressure (engagement hydraulic pressure) PbBK1 with respect to the brake BK1. A hydraulic control device (not illustrated) controls the supplying hydraulic pressures with respect to the clutch CL1 and the brake BK1 according to the command values of each engagement hydraulic pressure PbCL1, PbBK1.

In the vehicle 100, the hybrid (HV) traveling or the EV traveling can be selectively executed. The HV traveling is a traveling mode of traveling the vehicle 100 with the engine 1 as the power source. In the HV traveling, the second rotating machine MG2 may be further employed as the power source in addition to the engine 1.

The EV traveling is a traveling mode of traveling the vehicle with at least one of the first rotating machine MG1 or the second rotating machine MG2 as the power source. In the EV traveling, the vehicle can be traveled with the engine 1 stopped. The hybrid vehicle driving device 1-1 according to the present embodiment has, for the EV traveling mode, a single motor EV mode (single drive EV mode) of traveling the vehicle 100 with the second rotating machine MG2 as a single power source, and a two-drive EV mode (two-motor EV mode) of traveling the vehicle 100 with the first rotating machine MG1 and the second rotating machine MG2 as the power source.

In the engagement table of FIG. 4, a circle mark in the field of the clutch CL1 and the field of the brake BK1 indicates engagement and a blank field indicates release. A triangle mark indicates engagement of either the clutch CL1 or the brake BK1 and release of the other. The single motor EV mode is executed by releasing both the clutch CL1 and the brake BK1, for example. FIG. 5 is a collinear diagram related to the single motor EV mode. In the collinear diagram, reference symbols S1, C1, R1 indicate the first sun gear 11, the first carrier 14, and the first ring gear 13, and reference symbols S2, C2, R2 indicate the second sun gear 21, the second carrier 24, and the second ring gear 23.

In the single motor EV mode, the clutch CL1 and the brake BK1 are released. The rotation of the first sun gear 11 is tolerated as the brake BK1 is released, and the first planetary gear mechanism 10 can be made operational as the clutch CL1 is released. The HV_ECU 50 outputs a positive torque to the second rotating machine MG2 through the MG_ECU 60 to cause the vehicle 100 to generate a drive force in a forward moving direction. The second ring gear 23 positive rotates in cooperation with the rotation of the drive wheel 32. The positive rotation is the rotating direction of the second ring gear 23 in the forward movement of the vehicle 100. The HV_ECU 50 activates the first rotating machine MG1 as a generator to reduce a dragging loss. Specifically, the HV_ECU 50 applies a small torque on the first rotating machine MG1 to generate power, and assumes the rotation speed of the first rotating machine MG1 as zero rotation. Thus, the dragging loss of the first rotating machine MG1 can be reduced. If the MG1 rotation speed can be maintained at zero using a cogging torque even if the MG1 torque is zero, the MG1 torque may not be applied. Alternatively, the MG1 rotation speed may be assumed as zero by a d-axis lock of the first rotating machine MG1.

The first ring gear 13 follows the second carrier 24 and positive rotates. In the first planetary gear mechanism 10, the clutch CL1 and the brake BK1 are released and in a neutral state, and hence the engine 1 does not follow and the first carrier 14 stops the rotation. A large regenerative amount thus can be obtained. The first sun gear 11 idles and negative rotates. The neutral state of the first planetary gear mechanism 10 is a state in which the power is not transmitted between the first ring gear 13 and the first carrier 14, that is, a state in which the engine 1 and the second planetary gear mechanism 20 are separated and the transmission of power is shielded. The first planetary gear mechanism 10 is in a connected state of connecting the engine 1 and the second planetary gear mechanism 20 when at least one of the clutch CL1 or the brake BK1 is engaged.

At the time of traveling in the single motor EV mode, the charging state of the battery is full and the regenerative energy may not be obtained. In this case, simultaneous use of the engine brake is considered. The engine 1 can be connected to the drive wheel 32 and the engine brake can be acted on the drive wheel 32 by engaging the clutch CL1 or the brake BK1. As illustrated with a triangle mark in FIG. 4, the engine 1 is in a following state, and the engine rotation speed can be raised in the first rotating machine MG1 to realize the engine brake state by engaging the clutch CL1 or the brake BK1 in the single motor EV mode.

In the two-drive EV mode, the HV_ECU 50 engages the clutch CL1 and the brake BK1. FIG. 6 is a collinear view related to the two-drive EV mode. The differential of the first planetary gear mechanism 10 is regulated when the clutch CL1 is engaged, and the rotation of the first sun gear 11 is regulated when the brake BK1 is engaged. Therefore, the rotation of all rotation elements of the first planetary gear mechanism 10 is stopped. When the rotation of the first ring gear 13, which is the output element, is regulated, the second carrier 24 connected thereto is locked to zero rotation.

The HV_ECU 50 outputs a torque for traveling drive to each of the first rotating machine MG1 and the second rotating machine MG2. When the rotation is regulated, the second carrier 24 can obtain a reactive force with respect to the torque of the first rotating machine MG1 and output the torque of the first rotating machine MG1 from the second ring gear 23. The first rotating machine MG1 can output a positive torque from the second ring gear 23 by outputting a negative torque and negative rotating at the time of forward movement. At the time of backward movement, on the other hand, the first rotating machine MG1 can output a negative torque from the second ring gear 23 by outputting a positive torque and positive rotating.

In the HV traveling, the second planetary gear mechanism 20 serving as a differential unit is basically in the differential state, and the first planetary gear mechanism 10 serving as a transmission unit is switched to low/high. FIG. 7 is a collinear diagram related to the HV traveling mode (hereinafter also described as "HV low mode") of the low state, and FIG. 8 is a collinear diagram related to the HV traveling mode (hereinafter also described as "HV high mode") of the high state.

In the HV low mode, the HV_ECU 50 engages the clutch CL1 and releases the brake BK1. The differential of the first planetary gear mechanism 10 is regulated when the clutch CL1 is engaged, and each rotation element 11, 13, 14 is integrally rotated. Therefore, the rotation of the engine 1 is not speed increased nor speed reduced, and is transmitted from the first ring gear 13 to the second carrier 24 at an equal speed.

On the other hand, in the HV high mode, the HV_ECU 50 releases the clutch CL1 and engages the brake BK1. The rotation of the first sun gear 11 is regulated when the brake BK1 is engaged. Thus, the first planetary gear mechanism 10 is in an overdrive (OD) state in which the rotation of the engine 1 input to the first carrier 14 is speed increased and output from the first ring gear 13. Thus, the first planetary gear mechanism 10 can speed increase the rotation of the engine 1 and output the same. The gear ratio of the first planetary gear mechanism 10 at the time of the overdrive is, for example, 0.7.

Thus, a switching device including the clutch CL1 and the brake BK1 switches a state of regulating the differential of the first planetary gear mechanism 10 and a state of tolerating the differential of the first planetary gear mechanism 10 to change the speed of the first planetary gear mechanism 10. The hybrid vehicle driving device 1-1 can switch the HV high mode and the HV low mode by the transmission unit including the first planetary gear mechanism 10, the clutch CL1, and the brake BK1, and can enhance the transmission efficiency of the vehicle 100. The second planetary gear mechanism 20 serving as a differential unit is connected in series to the post-stage of the transmission unit. Since the first planetary gear mechanism 10 is in overdrive, an advantage in that a greatly increased torque of the first rotating machine MG1 does not need to be obtained.

The HV_ECU 50 selects the EV traveling in a motor traveling region of low vehicle speed and low load in which the required drive force is small, for example. In the motor traveling region, for example, the single motor EV mode is selected at the time of low load, and the two-drive EV mode is selected at the time of high load. A region of higher vehicle speed and higher load than the motor traveling region is an engine traveling region. The HV_ECU 50 selects the HV low mode in the region of middle-low vehicle speed and high load of the engine traveling region, and selects the HV high mode in the region of high vehicle speed and low load. The fuel efficiency can be improved by having the transmission unit in the overdrive at the time of high vehicle speed and low load.

In the present embodiment, the rotation speed of the engine 1 is changed and output by the switching of the HV high mode and the HV low mode, so that two mechanical points are obtained and the fuel efficiency can be improved. The mechanical point is a highly efficient operation point at which the power input to the planetary gear mechanisms 10, 20 is transmitted to all counter drive gears 25 by a mechanical transmission without passing an electrical path.

In the hybrid vehicle driving device 1-1 according to the present embodiment, the first planetary gear mechanism 10 speed increases the rotation of the engine 1, and outputs the same from the first ring gear 13. Therefore, the hybrid vehicle driving device 1-1 has another mechanical point on the high gear side with respect to the mechanical point of when the engine 1 is directly connected to the second carrier 24 without arranging the first planetary gear mechanism 10. That is, the hybrid vehicle driving device 1-1 has two mechanical points on the high gear side. The hybrid vehicle driving device 1-1 thus can realize a hybrid system capable of improving the fuel efficiency by the enhancement of the transmission efficiency at the time of high speed traveling.

The hybrid vehicle driving device 1-1 engages the clutch CL1 and the brake BK1 of the transmission unit to regulate the rotation of the output element of the first planetary gear mechanism 10 and the input element of the second planetary gear mechanism 20, and can enable the traveling by the two-drive EV mode. Thus, a separate clutch, and the like do not need to be arranged to realize the two-drive EV mode, and the configuration is simplified. In the layout of the present embodiment, a large speed reducing ratio of the second rotating machine MG2 can be obtained. Furthermore, a compact arrangement can be realized by the FF or RR layout.

(Backward Movement Traveling)

When carrying out the backward movement traveling, during the engine traveling, the first rotating machine MG1 generates power as a generator and the second rotating machine MG2 carries out power running as a motor and negative rotates to output a negative torque for traveling. If the charging state of the battery is sufficient, the second rotating machine MG2 may reverse rotate alone to motor travel in the single drive EV mode. Further, the second carrier 24 may be fixed and the backward movement traveling can be carried out in the two-drive EV mode.

(Cooperative Gear Change Control)

The HV_ECU 50 can execute the cooperative gear change control of simultaneously gear changing the first planetary gear mechanism 10 and the second planetary gear mechanism 20 when switching the HV high mode and the HV low mode. The HV_ECU 50 increases the gear ratio of one of the first planetary gear mechanism 10 or the second planetary gear mechanism 20 and reduces the gear ratio of the other mechanism in the cooperative gear change control.

When switching from the HV high mode to the HV low mode, the HV_ECU 50 changes the gear ratio of the second planetary gear mechanism 20 toward the high gear side in synchronization with the switching of the mode. Thus, a discontinuous change in the gear ratio entirely from the engine 1 to the drive wheel 32 of the vehicle 100 can be suppressed or reduced, and the degree of change in the gear ratio can be reduced. Since the change in the gear ratio from the engine 1 to the drive wheel 32 is suppressed, the adjustment amount of the engine rotation speed involved in the gear change can be reduced or the adjustment of the engine rotation speed becomes unnecessary. The HV_ECU 50 cooperatively changes the speeds of the first planetary gear mechanism 10 and the second planetary gear mechanism 20 to continuously change the gear ratio in the entire vehicle 100 toward the low side, for example.

On the other hand, when switching from the HV low mode to the HV high mode, the HV_ECU 50 changes the gear ratio of the second planetary gear mechanism 20 toward the low gear side in synchronization with the switching of the mode. Thus, the discontinuous change in the gear ratio in the entire vehicle 100 is suppressed or reduced, and the degree of change in the gear ratio can be reduced. The HV_ECU 50, for example, cooperatively changes the speeds of the first planetary gear mechanism 10 and the second planetary gear mechanism 20 so as to continuously change the gear ratio in the entire vehicle 100 toward the high side.

The gear ratio of the second planetary gear mechanism 20 is adjusted by the control of the rotation speed of the first rotating machine MG1, for example. The HV_ECU 50, for example, controls the first rotating machine MG1 so as to change, in a continuous manner, the gear ratio between the input shaft 2 and the counter drive gear 25. Thus, the entire transmission device including the planetary gear mechanisms 10, 20, the first rotating machine MG1, the clutch CL1, and the brake BK1, that is, the transmission device including the differential unit and the transmission unit operate as an electrical continuous transmission. The gear ratio width of the transmission device including the differential unit and the transmission unit is wide, and hence a relatively large gear ratio from the differential unit to the drive wheel 32 can be obtained. The power circulation at the time of high vehicle speed traveling of the HV traveling mode is reduced.

(Engine Start Control)

When starting the engine 1 from the single motor EV mode, the clutch CL1 or the brake BK1 is engaged and the engine rotation speed is raised by the first rotating machine MG1 to carry out ignition. In this case, the rotation speed of the second carrier 24 (first ring gear 13) may be made to zero rotation by the rotation speed control of the first rotating machine MG1 before engaging the clutch CL1 or the brake BK1. The reactive force torque in the direction of lowering the traveling drive force is generated when raising the engine rotation speed by the MG1 torque. The HV_ECU 50 may additionally output the reactive force cancel torque that cancels the reactive force torque to the second rotating machine MG2. When starting the engine 1 from the two-drive EV mode, the engine rotation speed is gradually raised by the first rotating machine MG1 to carry out ignition with the brake BK1 released first and the clutch CL1 engaged. If the engine 1 can be independently started such as a direct injection engine, and the like, the engine 1 may be independently started or the independent starting of the engine 1 may be assisted by the MG1 torque.

The vehicle 100 according to the present embodiment travels with either one of the clutch CL1 or the brake BK1 engaged, and the other one released in the HV traveling mode. If both the clutch CL1 and the brake BK1 are simultaneously engaged during the HV traveling, the rotation of the engine 1 is regulated. Therefore, the clutch CL1 and the brake BK1 are preferably regulated from simultaneously engaging during the HV traveling. On the other hand, the clutch CL1 and the brake BK1 need to be simultaneously engaged to travel the vehicle 100 in the two-drive EV mode.

As will be described below with reference to FIG. 9 and FIG. 10, the hybrid vehicle driving device 1-1 according to the present embodiment includes a hydraulic circuit 2-1 for supplying a hydraulic pressure to the plurality of engagement devices CL1, BK1. The hydraulic circuit 2-1 can switch a state of regulating the plurality of engagement devices CL1, BK1 from simultaneously engaging and a state of tolerating the plurality of engagement devices CL1, BK1 from simultaneously engaging. The hydraulic circuit 2-1 of the present embodiment includes a simultaneous engagement preventing circuit 2-11 and an inactivating circuit 2-12 that inactivates the simultaneous engagement preventing circuit 2-11. The inactivating circuit 2-12 disables the simultaneous engagement preventing circuit 2-11, and enables the plurality of engagement devices CL1, BK1 to simultaneously engage. Thus, according to the hybrid vehicle driving device 1-1 of the present embodiment can appropriately regulate or tolerate the plurality of engagement devices CL1, BK1 from simultaneously engaging, and can appropriately control the engaged state of the clutch CL1 and the brake BK1.

The phrase "simultaneously engage the plurality of engagement devices CL1, BK1" is not limited to the clutch CL1 and the brake BK1 engaging at the same timing, and means that both the clutch CL1 and the brake BK1 are in the engaged state. For example, simultaneous engagement includes a case in which the brake BK1 is engaged from the state the clutch CL1 is already engaged so that both are in the engaged state and a case in which the clutch CL1 is engaged from the state the brake BK1 is already engaged so that both are in the engaged state.

As illustrated in FIG. 9, the simultaneous engagement preventing circuit 2-11 is configured to include a first oil pump 41, a first linear solenoid SL1, a first simultaneous engagement preventing valve 46, a second linear solenoid SL2, and a second simultaneous engagement preventing valve 48. The inactivating circuit 2-12 is configured to include a second oil pump 51, an oil path 55, a first control oil path 57, a second control oil path 58, and a switching valve 56.

The first oil pump 41 is a mechanical pump driven by the rotation of the engine 1, and supplies the hydraulic pressure with respect to the plurality of engagement devices CL1, BK1. The first oil pump 41 discharges the oil to a line pressure oil path 42. A primary regulator valve 44 is connected to the line pressure oil path 42. The hydraulic pressure of the line pressure oil path 42 is adjusted to a line pressure PL by the primary regulator valve 44. The line pressure oil path 42 is connected to the clutch CL1 by way of a first supply oil path 45. The first linear solenoid SL1 and the first simultaneous engagement preventing valve 46 are arranged on the first supply oil path 45. The first linear solenoid SL1 adjusts the hydraulic pressure supplied from the line pressure oil path 42, and creates an engagement hydraulic pressure PbCL1 of the clutch CL1 with a direct pressure method. The first linear solenoid SL1 can adjust the engagement hydraulic pressure PbCL1 of the clutch CL1 to an arbitrary hydraulic pressure from zero (valve closed state) to the line pressure PL.

The line pressure oil path 42 is connected to the brake BK1 by way of a second supply oil path 47. The second linear solenoid SL2 and the second simultaneous engagement preventing valve 48 are arranged on the second supply oil path 47. The second linear solenoid SL2 adjusts the hydraulic pressure supplied from the line pressure oil path 42, and creates an engagement hydraulic pressure PbBK1 of the brake BK1 with the direct pressure method. The second linear solenoid SL2 can adjust the engagement hydraulic pressure PbBK1 of the brake BK1 to an arbitrary hydraulic pressure from zero (valve closed state) to the line pressure PL.

The first simultaneous engagement preventing valve 46 is arranged between the first linear solenoid SL1 and the clutch CL1. The first simultaneous engagement preventing valve 46 is a valve that regulates the plurality of engagement devices CL1, BK1 from simultaneously engaging, and can be switched to a valve opened state that communicates the first linear solenoid SL1 and the clutch CL1, and a valve closed state that shields the first linear solenoid SL1 and the clutch CL1. The first simultaneous engagement preventing valve 46 in the valve closed state releases the engagement hydraulic pressure PbCL1 acting on the clutch CL1 to release the clutch CL1.

The first simultaneous engagement preventing valve 46 generates a biasing force in the valve opening direction by a return spring 46a. The first simultaneous engagement preventing valve 46 generates a force in the valve opening direction by the engagement hydraulic pressure PbCL1 of the clutch CL1 supplied through a branched oil path 45b. The branched oil path 45b supplies the hydraulic pressure on the clutch CL1 side than the first simultaneous engagement preventing valve 46 in the first supply oil path 45 to the first simultaneous engagement preventing valve 46, and generates the force in the valve opening direction with respect to the first simultaneous engagement preventing valve 46.

The first simultaneous engagement preventing valve 46 is connected to the second supply oil path 47 by way of a branched oil path 47a. The branched oil path 47a communicates the second supply oil path 47 on the second simultaneous engagement preventing valve 48 side than the second linear solenoid SL2 and the first simultaneous engagement preventing valve 46. The engagement hydraulic pressure PbBK1 supplied through the second linear solenoid SL2 is supplied to the first simultaneous engagement preventing valve 46 through the branched oil path 47a to generate the force in the valve closing direction with respect to the first simultaneous engagement preventing valve 46. When the engagement hydraulic pressures PbCL1, PbBK1 are not acting, the first simultaneous engagement preventing valve 46 is opened by the biasing force of the return spring 46a to communicate the first linear solenoid SL1 and the clutch CL1.

The second simultaneous engagement preventing valve 48 is arranged between the second linear solenoid SL2 and the brake BK1. The second simultaneous engagement preventing valve 48 is a valve that regulates the plurality of engagement devices CL1, BK1 from simultaneously engaging, and can be switched to a valve opened state of communicating the second linear solenoid SL2 and the brake BK1, and a valve closed state of shielding the second linear solenoid SL2 and the brake BK1. The second simultaneous engagement preventing valve 48 in the valve closed state releases the engagement hydraulic pressure PbBK1 acting on the brake BK1 to release the brake BK1.

The second simultaneous engagement preventing valve 48 generates a biasing force in the valve opening direction by a return spring 48a. The second simultaneous engagement preventing valve 48 generates a force in the valve opening direction by the engagement hydraulic pressure PbBK1 of the brake BK1 supplied through a branched oil path 47b. The branched oil path 47b supplies the hydraulic pressure on the brake BK1 side than the second simultaneous engagement preventing valve 48 in the second supply oil path 47 to the second simultaneous engagement preventing valve 48, and generates a force in the valve opening direction with respect to the second simultaneous engagement preventing valve 48.

The second simultaneous engagement preventing valve 48 is connected to the first supply oil path 45 by way of a branched oil path 45a. The branched oil path 45a communicates the first supply oil path 45 on the first simultaneous engagement preventing valve 46 side than the first linear solenoid SL1 and the second simultaneous engagement preventing valve 48. The hydraulic pressure supplied through the first linear solenoid SL1 is supplied to the second simultaneous engagement preventing valve 48 through the branched oil path 45a and generates a force in the valve closing direction with respect to the second simultaneous engagement preventing valve 48. When the engagement hydraulic pressures PbCL1, PbBK1 are not acting, the second simultaneous engagement preventing valve 48 is opened by the biasing force of the return spring 48a to communicate the second linear solenoid SL2 and the brake BK1.

The hydraulic circuit 2-1 can regulate the clutch CL1 and the brake BK1 from simultaneously engaging (hereinafter simply described as "simultaneous engagement") by the two simultaneous engagement preventing valves 46, 48. For example, as illustrated in FIG. 9, even if the second linear solenoid SL2 is activated and the engagement hydraulic pressure PbBK1 is supplied toward the brake BK1 when the clutch CL1 is engaged, the simultaneous engagement is regulated by the second simultaneous engagement preventing valve 48. In the state the clutch CL1 is engaged, as illustrated in FIG. 9, the force in the valve closing direction is generated with respect to the second simultaneous engagement preventing valve 48 by the engagement hydraulic pressure PbCL1 supplied through the branched oil path 45a to close the second simultaneous engagement preventing valve 48 against the biasing force of the return spring 48a. Therefore, even if the second linear solenoid SL2 is opened from this state and the hydraulic pressure is supplied toward the brake BK1, the second linear solenoid SL2 and the brake BK1 are shielded by the second simultaneous engagement preventing valve 48 and the brake BK1 is regulated from engaging.

In the first simultaneous engagement preventing valve 46, the force in the valve closing direction is generated by the engagement hydraulic pressure PbBK1 supplied through the branched oil path 47a, but the force in the valve opening direction by the engagement hydraulic pressure PbCL1 of the clutch CL1 is acting in addition to the biasing force of the return spring 46a, and hence the valve opened state is maintained. Therefore, the simultaneous engagement is regulated as the engagement of the brake BK1 is regulated, and the engagement of the clutch CL1 is maintained.

Similarly, if the brake BK1 is engaged first, the hydraulic pressure supply with respect to the clutch CL1 is regulated by the first simultaneous engagement preventing valve 46 even if the first linear solenoid SL1 is opened. Thus, the simultaneous engagement is regulated, and the engaged state of the brake BK1 is maintained.

The hydraulic circuit 2-1 can cause the first simultaneous engagement preventing valve 46 and the second simultaneous engagement preventing valve 48 to be in the inactivated state and can tolerate the simultaneous engagement. The inactivating circuit 2-12, which is a means for inactivating the simultaneous engagement preventing valves 46, 48, is configured to include the second oil pump 51 and the switching valve 56. The simultaneous engagement preventing valves 46, 48 regulate the plurality of engagement devices CL1, BK1 from simultaneously engaging when the hydraulic pressure of the first oil pump 41 is supplied and the hydraulic pressure of the second oil pump 51 is not supplied. On the other hand, the simultaneous engagement preventing valves 46, 48 tolerate the plurality of engagement devices CL1, BK1 from simultaneously engaging when the hydraulic pressure of the second oil pump 51 is supplied. For example, the simultaneous engagement preventing valves 46, 48 tolerate the plurality of engagement devices CL1, BK1 from simultaneously engaging when the hydraulic pressure of the second oil pump 51 is supplied and the hydraulic pressure of the first oil pump 41 is not supplied. Furthermore, even if the hydraulic pressure of both the first oil pump 41 and the second oil pump 51 is supplied, the simultaneous engagement preventing valves 46, 48 tolerate the plurality of engagement devices CL1, BK1 from simultaneously engaging.

The second oil pump 51 is an electric oil pump driven by the rotation of a motor 52. The second oil pump 51 is driven when the engine 1 is stopped, and supplies the hydraulic pressure with respect to the plurality of engagement devices CL1, BK1 and the simultaneous engagement preventing valves 46, 48. The second oil pump 51 is controlled by the HV_ECU 50, for example. The hydraulic pressure of the second oil pump 51 is adjusted to the line pressure PL by a secondary regulator valve 53. The second oil pump 51 is connected to the line pressure oil path 42 by way of an oil path 54 and a check valve 43. The check valve 43 tolerates the flow of the oil from the second oil pump 51 toward the line pressure oil path 42, and regulates the flow of the oil in the opposite direction. When the engine 1 is stopped and the first oil pump 41 is stopped, the line pressure PL is supplied to the line pressure oil path 42 by the second oil pump 51.

The oil path 54 is connected to the first simultaneous engagement preventing valve 46 by way of the oil path 55 and the first control oil path 57, and is connected to the second simultaneous engagement preventing valve 48 by way of the oil path 55 and the second control oil path 58. The hydraulic pressure supplied through the first control oil path 57 generates a force in the valve opening direction with respect to the first simultaneous engagement preventing valve 46. The hydraulic pressure supplied through the second control oil path 58 generates a force in the valve opening direction with respect to the second simultaneous engagement preventing valve 48.

The switching valve 56 is arranged on the oil path 55. The switching valve 56 is an electromagnetic valve, and can be switched to the valve opened state and the valve closed state. When the switching valve 56 is opened while the second oil pump 51 is activated, the hydraulic pressure of the line pressure PL generates a force in the valve opening direction with respect to each of the first simultaneous engagement preventing valve 46 and the second simultaneous engagement preventing valve 48, as illustrated in FIG. 10. Thus, the first simultaneous engagement preventing valve 46 is maintained in the valve opened state by the biasing force of the return spring 46a and the valve opening force by the line pressure PL against the valve closing force by the engagement hydraulic pressure PbBK1 acting through the branched oil path 47a. Similarly, the second simultaneous engagement preventing valve 48 is maintained in the valve opened state by the biasing force of the return spring 48a and the valve opening force by the line pressure PL against the valve closing force by the engagement hydraulic pressure PbCL1 acting through the branched oil path 45a.

Therefore, the clutch CL1 and the brake BK1 are tolerated from simultaneously engaging. When both the first linear solenoid SL1 and the second linear solenoid SL2 are valve opened, the supplying hydraulic pressure of the first linear solenoid SL1 is supplied to the clutch CL1 and the supplying hydraulic pressure of the second linear solenoid SL2 is supplied to the brake BK1, as illustrated in FIG. 10. In this case, the hydraulic pressure of the second supply oil path 47 is supplied to the first simultaneous engagement preventing valve 46 through the branched oil path 47a, thus generating the force in the valve closing direction. However, since the biasing force of the return spring 46a and the force in the valve opening direction by the line pressure PL from the second oil pump 51 are acting on the first simultaneous engagement preventing valve 46, the valve opened state is maintained. Furthermore, the hydraulic pressure of the first supply oil path 45 is supplied to the second simultaneous engagement preventing valve 48 through the branched oil path 45a, thus generating the force in the valve closing direction. However, since the biasing force of the return spring 48a and the force in the valve opening direction by the line pressure PL from the second oil pump 51 are acting on the second simultaneous engagement preventing valve 48, the valve opened state is maintained.

Thus, when the hydraulic pressure from the second oil pump 51 is supplied to the first simultaneous engagement preventing valve 46 and the second simultaneous engagement preventing valve 48 through the first control oil path 57 and the second control oil path 58, each simultaneous engagement preventing valve 46, 48 is maintained in the inactivated state (valve opened state) that tolerates the simultaneous engagement. Therefore, the clutch CL1 and the brake BK1 can be simultaneously engaged and the two-drive EV mode can be executed.

The operation of the hybrid vehicle driving device 1-1 according to the present embodiment will now be described with reference to FIG. 1. The control flow illustrated in FIG. 1 is repeatedly executed at a predetermined interval during the traveling of the vehicle 100, for example.

First, in step S10, it is determined by the HV_ECU 50 whether or not the vehicle 100 is in motor traveling. The HV_ECU 50 determines whether or not the vehicle 100 is traveling in the EV traveling mode. The process proceeds to step S20 if determined as in motor traveling as a result of the determination (step S10—Y), and proceeds to step S40 if determined otherwise (step S10—N).

In step S20, it is determined by the HV_ECU 50 whether or not the vehicle 100 is in the two-drive mode. The HV_ECU 50 determines whether or not the vehicle 100 is traveling in the two-drive EV mode using two motors, the first rotating machine MG1 and the second rotating machine MG2. The process proceeds to step S30 if determined as in two-drive mode as a result of the determination (step S20—Y), and proceeds to step S40 if determined otherwise (step S20—N).

In step S30, the simultaneous engagement preventing circuit 2-11 is inactivated by the HV_ECU 50. The HV_ECU 50 opens the switching valve 56. The hydraulic pressure (signal pressure) from the second oil pump 51 is supplied to the first simultaneous engagement preventing valve 46 through the first control oil path 57 and to the second simultaneous engagement preventing valve 48 through the second control oil path 58. The first simultaneous engagement preventing valve 46 and the second simultaneous engagement preventing valve 48 are thus in the inactivated state, and the simultaneous engagement of the clutch CL1 and the brake BK1 is tolerated. After step S30 is executed, the present control flow is terminated.

In step S40, the HV_ECU 50 activates the simultaneous engagement preventing circuit 2-11. In step S40, the simultaneous engagement preventing state is released by the HV_ECU 50. The HV_ECU 50 closes the switching valve 56. The hydraulic pressure from the second oil pump 51 is thus shielded by the switching valve 56, and is not supplied to the first simultaneous engagement preventing valve 46 and the second simultaneous engagement preventing valve 48. The switching valve 56 in the valve closed state releases the hydraulic pressure of the first control oil path 57 and the second control oil path 58. Therefore, the simultaneous engagement preventing circuit 2-11 is in the activated state, and the simultaneous engagement of the clutch CL1 and the brake BK1 is regulated. After step S40 is executed, the present control flow is terminated.

As described above, according to the hybrid vehicle driving device 1-1 of the present embodiment, the simultaneous engagement of the plurality of engagement devices CL1, BK1 is regulated in the HV traveling mode (S10—N) and the single motor EV mode (S20—N) and the simultaneous engagement of the plurality of engagement devices CL1, BK1 is tolerated in the two-drive EV mode (S20—Y). The rotation of the engine 1 is suppressed from being regulated in the HV traveling mode by regulating the simultaneous engagement in at least the HV traveling mode. Furthermore, the execution of the two-drive EV mode can be enabled by tolerating the simultaneous engagement in at least the two-drive EV mode. Thus, the hybrid vehicle driving device 1-1 appropriately regulates or appropriately tolerates the plurality of engagement devices CL1, BK1 from simultaneously engaging.

In the hydraulic circuit 2-1 according to the present embodiment, the simultaneous engagement preventing circuit 2-11 is not inactivated even if the switching valve 56 is falsely activated during the HV traveling. During the HV traveling, the second oil pump 51 is not activated and thus does not generate the hydraulic pressure. The hydraulic pressure generated by the first oil pump 41 is not supplied to the oil path 54 since the check valve 43 is arranged. Therefore, even if the switching valve 56 is opened due to failure, and the like, the hydraulic pressure is not supplied to the control oil paths 57, 58, and the simultaneous engagement preventing valves 46, 48 will not be locked in the valve opened state. Therefore, the simultaneous engagement can be regulated by the simultaneous engagement preventing circuit 2-11 so that the rotation of the engine 1 can be suppressed from being regulated during the HV traveling.

In the hydraulic circuit 2-1 according to the present embodiment, whether or not to regulate the simultaneous engagement and the timing to regulate can be controlled when the second oil pump 51 is generating the hydraulic pressure by arranging the switching valve 56. For example, a state of regulating and a state of tolerating the simultaneous engagement can be selected in the single motor EV mode. By way of example, when rotating the engine 1 such as when starting the engine 1 in the EV traveling mode or when acting the engine brake, the simultaneous engagement may be regulated. Furthermore, the regulation of the simultaneous engagement and the toleration of the simultaneous engagement can be started at an arbitrary timing during the EV traveling.

Second Embodiment

Figure 11:
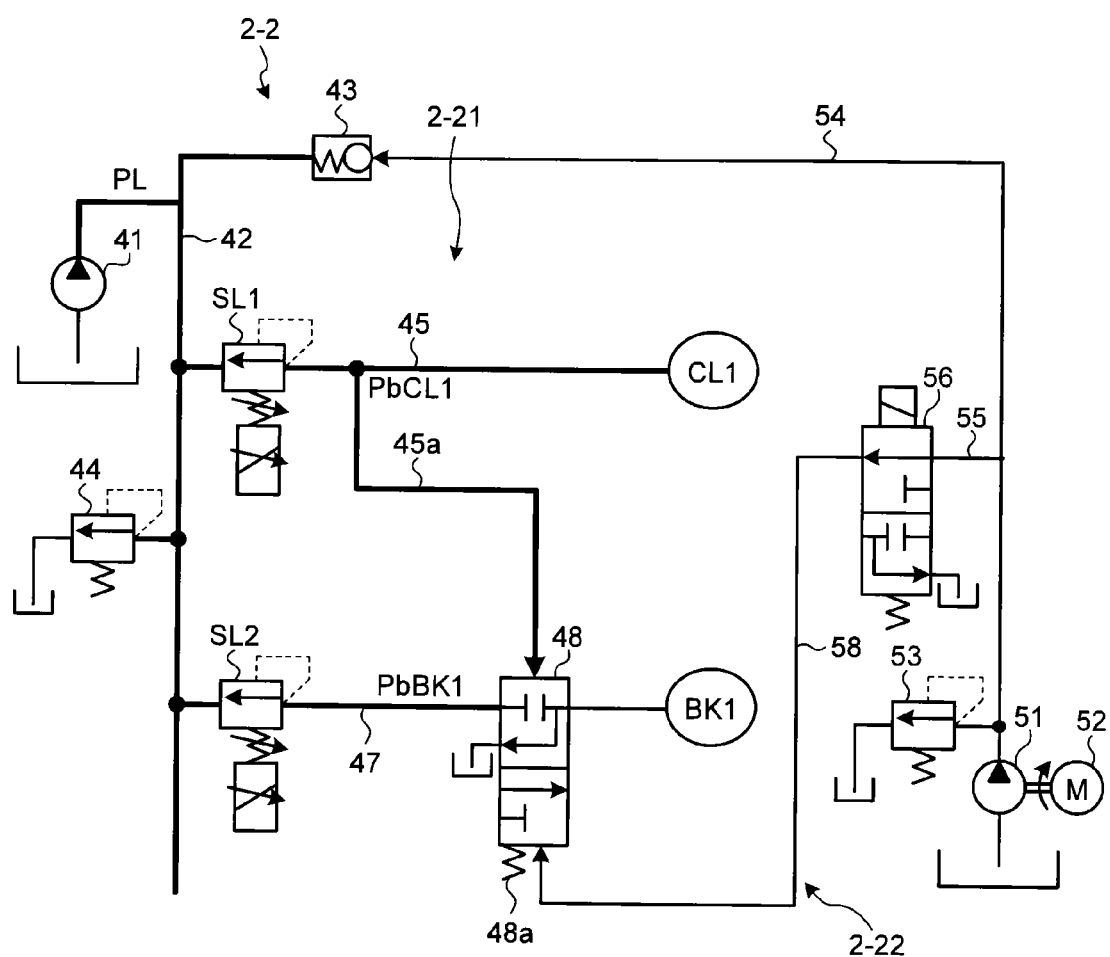
FIG. 11 is a hydraulic circuit diagram according to a second embodiment.

A second embodiment will be described with reference to FIG. 11. With respect to the second embodiment, the same reference numerals are denoted on the configuring elements having functions similar to those described in the first embodiment, and the redundant description will be omitted. FIG. 11 is a hydraulic circuit diagram according to the second embodiment. A hydraulic circuit 2-2 according to the present embodiment differs from the hydraulic circuit 2-1 of the first embodiment in that the hydraulic pressure supply with respect to the clutch CL1 is prioritized in a simultaneous engagement preventing circuit 2-21.

As illustrated in FIG. 11, in the simultaneous engagement preventing circuit 2-21 according to the present embodiment, the first simultaneous engagement preventing valve 46 is not arranged, different from the simultaneous engagement preventing circuit 2-11 (FIG. 9) of the first embodiment. Therefore, the output pressure of the first linear solenoid SL1 is supplied directly to the clutch CL1. The branched oil path 45a that supplies the hydraulic pressure from the first supply oil path 45 to the second simultaneous engagement preventing valve 48 is arranged, but the branched oil path 47a that supplies the hydraulic pressure from the second supply oil path 47 to the first simultaneous engagement preventing valve 46 is not arranged. Furthermore, the branched oil path 47b is not arranged, as opposed to the first embodiment. That is, the valve opening force by the engagement hydraulic pressure PbBK1 of the brake BK1 does not act on the second simultaneous engagement preventing valve 48.

Therefore, similar to the first embodiment, when the clutch CL1 is engaged, the engagement of the clutch CL1 is prioritized and the simultaneous engagement is prevented. When the engagement hydraulic pressure PbCL1 is supplied with respect to the clutch CL1 by the first linear solenoid SL1 and the clutch CL1 is engaged, the hydraulic pressure supply from the second linear solenoid SL2 to the brake BK1 is regulated by the second simultaneous engagement preventing valve 48. Even if the engagement hydraulic pressure PbBK1 is supplied with respect to the brake BK1 by the second linear solenoid SL2, the engagement of the brake BK1 is regulated since the second simultaneous engagement preventing valve 48 is closed.

On the other hand, as opposed to the first embodiment described above, the clutch CL1 is preferentially engaged although the brake BK1 is engaged before the engagement of the clutch CL1, and the simultaneous engagement is regulated. For example, when the hydraulic pressure supply with respect to the clutch CL1 is started by the first linear solenoid SL1 from the state in which the brake BK1 is engaged, the clutch CL1 is engaged by the engagement hydraulic pressure PbCL1 since the first simultaneous engagement preventing valve 46 is not arranged. The force in the valve closing direction acts on the second simultaneous engagement preventing valve 48 by the supplying hydraulic pressure PbCL1 of the clutch CL1, so that the second simultaneous engagement preventing valve 48 is closed against the biasing force of the return spring 48a. The hydraulic pressure supply with respect to the brake BK1 is thereby shielded and the hydraulic pressure of the brake BK1 is released thus releasing the brake BK1, whereby the simultaneous engagement is regulated. The biasing force of the return spring 48a is desirably defined so that the second simultaneous engagement preventing valve 48 is closed by the engagement hydraulic pressure PbCL1 lower than the hydraulic pressure at which the clutch CL1 starts to engage.

The switching valve 56 of the present embodiment is an electromagnetic valve of normal close type, different from the first embodiment.

An inactivating circuit 2-22 according to the present embodiment does not include the first control oil path 57, as opposed to the inactivating circuit 2-12 (FIG. 9) of the first embodiment. When the switching valve 56 is opened while the second oil pump 51 is activated, the force in the valve opening direction acts on the second simultaneous engagement preventing valve 48 by the pressure (signal pressure) supplied from the second oil pump 51. The valve opened state of the second simultaneous engagement preventing valve 48 is thereby maintained. The second simultaneous engagement preventing valve 48 is maintained in the valve opened state by the biasing force of the return spring 48a and the valve opening force by the line pressure PL from the second oil pump 51 even if the force in the valve closing direction is acting on the second simultaneous engagement preventing valve 48 by the engagement hydraulic pressure PbCL1 of the clutch CL1. Thus, the brake BK1 can be engaged from the state in which the clutch CL1 is engaged to realize simultaneous engagement, the clutch CL1 may be engaged from the state in which the brake BK1 is engaged to realize simultaneous engagement, or the clutch CL1 and the brake BK1 may be simultaneously engaged at the same timing, and hence the simultaneous engagement is tolerated.

According to the hydraulic circuit 2-2 of the present embodiment, if the simultaneous engagement preventing circuit 2-21 is enabled, the engagement of the clutch CL1 is prioritized when the hydraulic pressure supply that causes the clutch CL1 and the brake BK1 to simultaneously engage is carried out. A large drive force can be ensured since the low gear is realized when the clutch CL1 is engaged and the brake BK1 is released rather than when the brake BK1 is engaged and the clutch CL1 is released.

Third Embodiment

Figure 12:
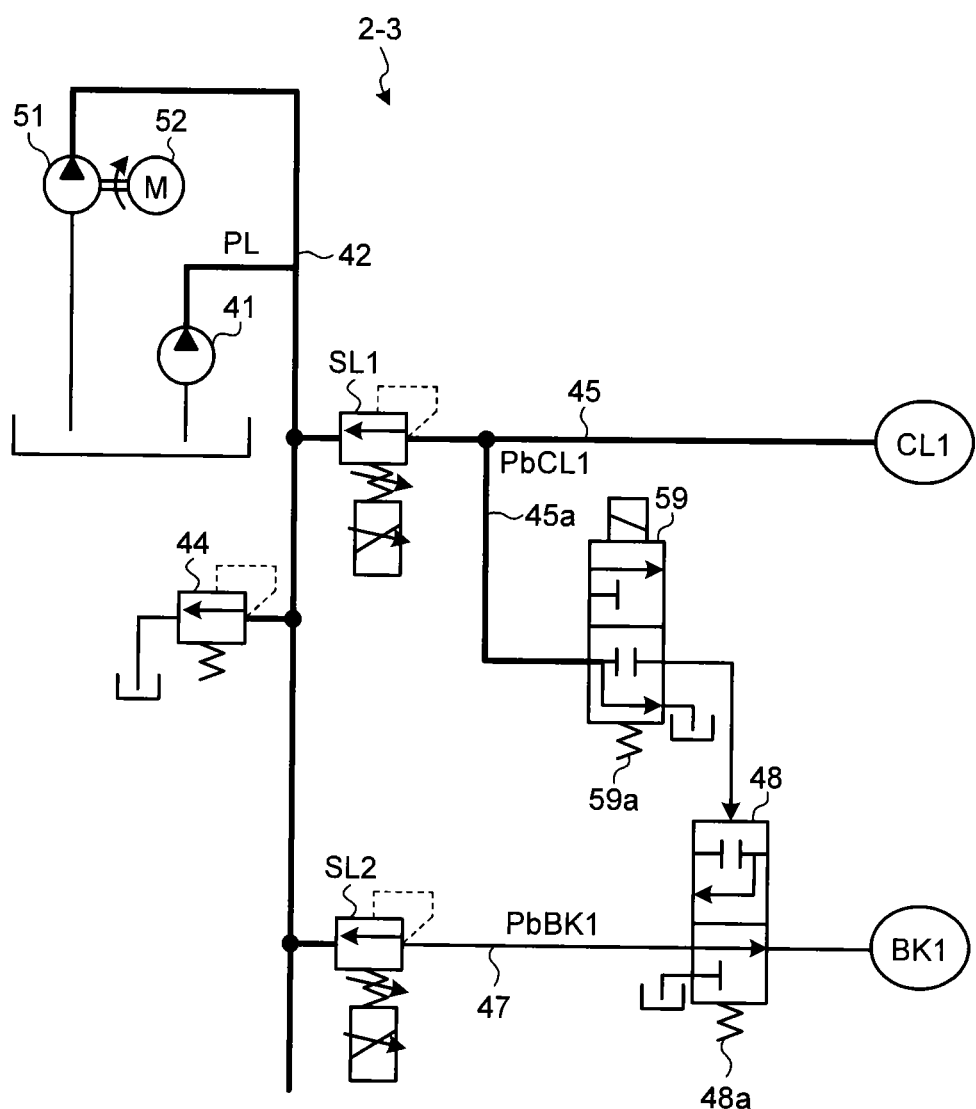
FIG. 12 is a hydraulic circuit diagram according to a third embodiment.

A third embodiment will be described with reference to FIG. 12. With respect to the third embodiment, the same reference numerals are denoted on the configuring elements having functions similar to those described in each embodiment above, and the redundant description will be omitted. FIG. 12 is a hydraulic circuit diagram according to the third embodiment. A hydraulic circuit 2-3 according to the present embodiment differs from the hydraulic circuits 2-1, 2-2 of the embodiments described above in that a switching valve 59 is arranged on the branched oil path 45a. Similar to the second embodiment, the hydraulic pressure supply with respect to the clutch CL1 is prioritized over the hydraulic pressure supply with respect to the brake BK1.

As illustrated in FIG. 12, the second oil pump 51 is arranged in parallel to the first oil pump 41. During the EV traveling, the first oil pump 41 is stopped and the second oil pump 51 is driven by the motor 52 to generate the hydraulic pressure. During the HV traveling, the first oil pump 41 is driven by the engine rotation to generate the hydraulic pressure, and the second oil pump 51 is stopped.

The switching valve 59 is arranged on the branched oil path 45a. The switching valve 59 is an electromagnetic valve, and can be switched to the valve opened state and the valve closed state. The switching valve 59 is a valve of a normal close type that closes by the biasing force of a return spring 59a when current is not flowing to the solenoid. When the switching valve 59 is opened while the engagement hydraulic pressure PbCL1 of the clutch CL1 is being supplied by the first linear solenoid SL1, the first supply oil path 45 and the second simultaneous engagement preventing valve 48 are communicated. The force in the valve closing direction thus acts on the second simultaneous engagement preventing valve 48 by the engagement hydraulic pressure PbCL1, and such valve closing force closes the second simultaneous engagement preventing valve 48 against the biasing force of the return spring 48a.

On the other hand, when the switching valve 59 is in the valve closed state, the first supply oil path 45 and the second simultaneous engagement preventing valve 48 are shielded. In this case, the engagement hydraulic pressure PbCL1 of the clutch CL1 is not supplied to the second simultaneous engagement preventing valve 48, and hence the second simultaneous engagement preventing valve 48 is in the inactivated state. If the second simultaneous engagement preventing valve 48 is maintained in the inactivated state, that is, the valve opened state, the simultaneous engagement of the plurality of engagement devices CL1, BK1 is tolerated.

The switching valve 59 is, for example, controlled by the HV_ECU 50. The HV_ECU 50, for example, tolerates the simultaneous engagement in the two-drive EV mode, and regulates the simultaneous engagement in the single motor EV mode and the HV traveling mode.

First Variant of Each Embodiment Described Above

A first variant of each embodiment described above will now be described. The simultaneous engagement is regulated in the single motor EV mode in each embodiment described above, but instead, the simultaneous engagement of the plurality of engagement devices CL1, BK1 may be tolerated in the single motor EV mode. In other words, the simultaneous engagement may be regulated in the HV traveling mode, and the simultaneous engagement may be tolerated in the EV traveling mode. In this case, the switching valve 56 may be omitted in the first embodiment and the second embodiment.

Second Variant of Each Embodiment Described Above

The hydraulic pressure supply with respect to the clutch CL1 is prioritized in the second embodiment and the third embodiment, but instead, the hydraulic pressure supply with respect to the brake BK1 may be prioritized.

Third Variant of Each Embodiment Described Above

The simultaneous engagement is regulated by the hydraulic circuit in each embodiment described above, but instead, the simultaneous engagement may be regulated in a software manner. For example, the engagement hydraulic pressure PbCL1 of the clutch CL1 and the engagement hydraulic pressure PbBK1 of the brake BK1 may be detected by the pressure sensor, and the like, and the linear solenoids SL1, SL2 may be controlled based on the detection results to regulate the simultaneous engagement.

For example, the start of the hydraulic pressure supply by the second linear solenoid SL2 is prohibited when the engagement hydraulic pressure PbCL1 of the clutch CL1 is greater than or equal to a predetermined hydraulic pressure, and the start of the hydraulic pressure supply by the first linear solenoid SL1 is prohibited when the engagement hydraulic pressure PbBK1 of the brake BK1 is greater than or equal to a predetermined hydraulic pressure, so that functions similar to the simultaneous engagement preventing circuit 2-11 of the first embodiment can be realized. Furthermore, when tolerating the simultaneous engagement, even if one of the engagement hydraulic pressures PbBK1, PbCL1 is greater than or equal to the predetermined hydraulic pressure, the hydraulic pressure supply by the other linear solenoid may be tolerated.

The hydraulic pressure supply with respect to one of the clutch CL1 or the brake BK1 may be prioritized, in a software manner, over the hydraulic pressure supply with respect to the other one.

Fourth Variant of Each Embodiment Described Above

In each embodiment described above, the plurality of engagement devices are the clutch CL1 and the brake BK1, but this is not the sole case. For example, the clutch CL1 may couple other rotation elements of the first planetary gear mechanism 10 instead of coupling the first sun gear 11 and the first carrier 14. The brake BK1 may regulate the rotation of another rotation element of the first planetary gear mechanism 10 instead of regulating the rotation of the first sun gear 11.

The number of plurality of engagement devices that change the speed of the first differential mechanism (first planetary gear mechanism 10 in the embodiment) is not limited to two, and may be three or more. In this case, all the engagement devices may be regulated from simultaneously engaging, or some engagement devices may be regulated from simultaneously engaging. By way of example, the simultaneous engagement may be regulated with respect to a combination of engagement devices that regulates the rotation of the engine 1 by simultaneously engaging, and the simultaneous engagement may be tolerated with respect to a combination of engagement devices that does not regulate the rotation of the engine 1 even when simultaneously engaged. Furthermore, the simultaneous engagement may be regulated with respect to a combination of engagement devices that regulates the rotation of the output element of the first differential mechanism by simultaneously engaging, and the simultaneous engagement may be tolerated with respect to a combination of engagement devices that does not regulate the rotation of the output element even when simultaneously engaged. Moreover, the plurality of engagement devices in which the simultaneous engagement is regulated may regulate the rotation of at least one of the output element of the first differential mechanism or the engine by simultaneously engaging.

Fifth Variant of Each Embodiment Described Above

The second oil pump 51 is driven by the electric motor 52 in each embodiment described above, but instead, the second oil pump 51 may be driven by another drive source. For example, the second oil pump 51 may be driven by the rotation of a wheel such as the drive wheel 32, and the like, or by the rotation of a drive system.

Each of the embodiment and the variants described above disclose the following driving device.

"A driving device including an engine, a transmission unit, and a differential unit, an output shaft of the engine being coupled to an input shaft of the transmission unit;

a first element of the differential unit being coupled to an output shaft of the transmission unit;

a first rotating machine (electrical machinery) being coupled to a second element;

a second rotating machine (electrical machinery) being coupled to a third element; and engagement elements of the transmission unit being simultaneously engaged to fix an engine rotation speed at zero; where switch is made to a case of tolerating and a case of prohibiting the simultaneous engagement of the plurality of engagement elements."

The contents disclosed in each of the embodiments and the variants described above may be appropriately combined and executed.

REFERENCE SIGNS LIST 1-1 HYBRID VEHICLE DRIVING DEVICE
2-1, 2-2, 2-3 HYDRAULIC CIRCUIT
2-11, 2-21 SIMULTANEOUS ENGAGEMENT PREVENTING CIRCUIT
2-12, 2-22 INACTIVATING CIRCUIT
1 ENGINE
10 FIRST PLANETARY GEAR MECHANISM
20 SECOND PLANETARY GEAR MECHANISM
21 SECOND SUN GEAR
22 SECOND PINION GEAR
23 SECOND RING GEAR
24 SECOND CARRIER
32 DRIVE WHEEL
41 FIRST OIL PUMP
46 FIRST SIMULTANEOUS ENGAGEMENT PREVENTING VALVE
48 SECOND SIMULTANEOUS ENGAGEMENT PREVENTING VALVE
51 SECOND OIL PUMP
100 VEHICLE
MG1 FIRST ROTATING MACHINE
MG2 SECOND ROTATING MACHINE
PbCL1, PbBK1 ENGAGEMENT HYDRAULIC PRESSURE
PL LINE PRESSURE

The invention claimed is:

1. A hybrid vehicle driving device comprising:
a first differential mechanism connected to an engine and transmitting a rotation of the engine;
a second differential mechanism connecting the first differential mechanism and a drive wheel;
a plurality of engagement devices changing a speed of the first differential mechanism; and
a valve arranged in a hydraulic circuit supplying a hydraulic pressure to the plurality of engagement devices, and selectively preventing the plurality of engagement devices from simultaneously engaging; and
an electronic control unit configured to control the valve to switch a state of preventing the plurality of engagement devices from simultaneously engaging and a state of allowing the plurality of engagement devices to simultaneously engage, wherein
the second differential mechanism includes a first rotation element connected to an output element of the first differential mechanism, a second rotation element connected to a first rotating machine, and a third rotation element connected to a second rotating machine and the drive wheel,
the electronic control unit is configured to control the valve to prevent the plurality of engagement devices from simultaneously engaging at a time of traveling with the engine as a power source, and control the valve to allow the plurality of engagement devices to simultaneously engage at a time of traveling with the first rotating machine and the second rotating machine as the power source.

2. The hybrid vehicle driving device according to claim 1, wherein the electronic control unit is configured to control valve to further prevent the plurality of engagement devices from simultaneously engaging at a time of traveling with the second rotating machine as a single power source.

3. The hybrid vehicle driving device according to claim 1, wherein the plurality of engagement devices are configured to regulate a rotation of at least one of the output element and the engine by simultaneously engaging.

4. The hybrid vehicle driving device according to claim 1, further comprising:

a first oil pump supplying a hydraulic pressure with respect to the plurality of engagement devices by being driven by the rotation of the engine; and a second oil pump supplying a hydraulic pressure with respect to the plurality of engagement devices and the valve by being driven at a time the engine is stopped, wherein the valve is configured to prevent the plurality of engagement devices from simultaneously engaging at a time the hydraulic pressure of the first oil pump is supplied, and to allow the plurality of engagement devices to simultaneously engage at a time the hydraulic pressure of the second oil pump is supplied.

5. A control method of controlling a hybrid vehicle driving device including a first differential mechanism connected to an engine and transmitting a rotation of the engine, a second differential mechanism connecting the first differential mechanism and a drive wheel, a plurality of engagement devices changing a speed of the first differential mechanism, and a valve arranged in a hydraulic circuit supplying a hydraulic pressure to the plurality of engagement devices and selectively preventing the plurality of engagement devices from simultaneously engaging, the second differential mechanism including a first rotation element connected to an output element of the first differential mechanism, a second rotation element connected to a first rotating machine, and a third rotation element connected to a second rotating machine and the drive wheel, the control method comprising:

determining a traveling mode of the hybrid vehicle; and controlling the valve to prevent the plurality of engagement devices from simultaneously engaging at a time of traveling with the engine as a power source, and controlling the valve to allow the plurality of engagement devices to simultaneously engage at a time of traveling with the first rotating machine and the second rotating machine as the power source.

6. The control method according to claim 5, further comprising:

controlling the valve to prevent the plurality of engagement devices from simultaneously engaging at a time of traveling with the second rotating machine as a single power source.

* * * * *